Figure 1:
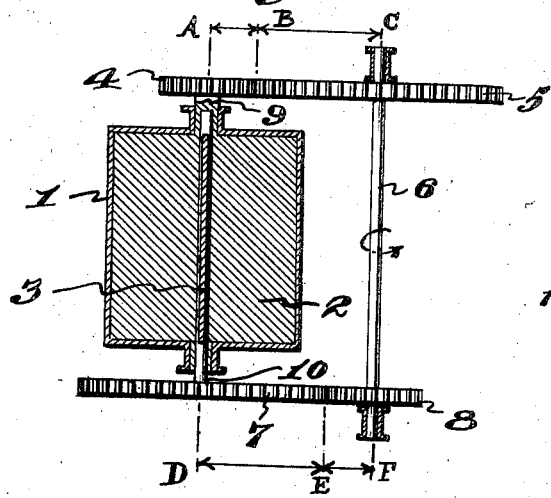

Feb. 15, 1938.   M. MURAKAMI   2,108,385
ROTARY ENGINE
Filed Aug. 30, 1935   2 Sheets-Sheet 1

INVENTOR:
M. Murakami
BY: Glascock Downing & Seebohm
ATTORNEYS.

Feb. 15, 1938.   M. MURAKAMI   2,108,385
ROTARY ENGINE
Filed Aug. 30, 1935   2 Sheets-Sheet 2
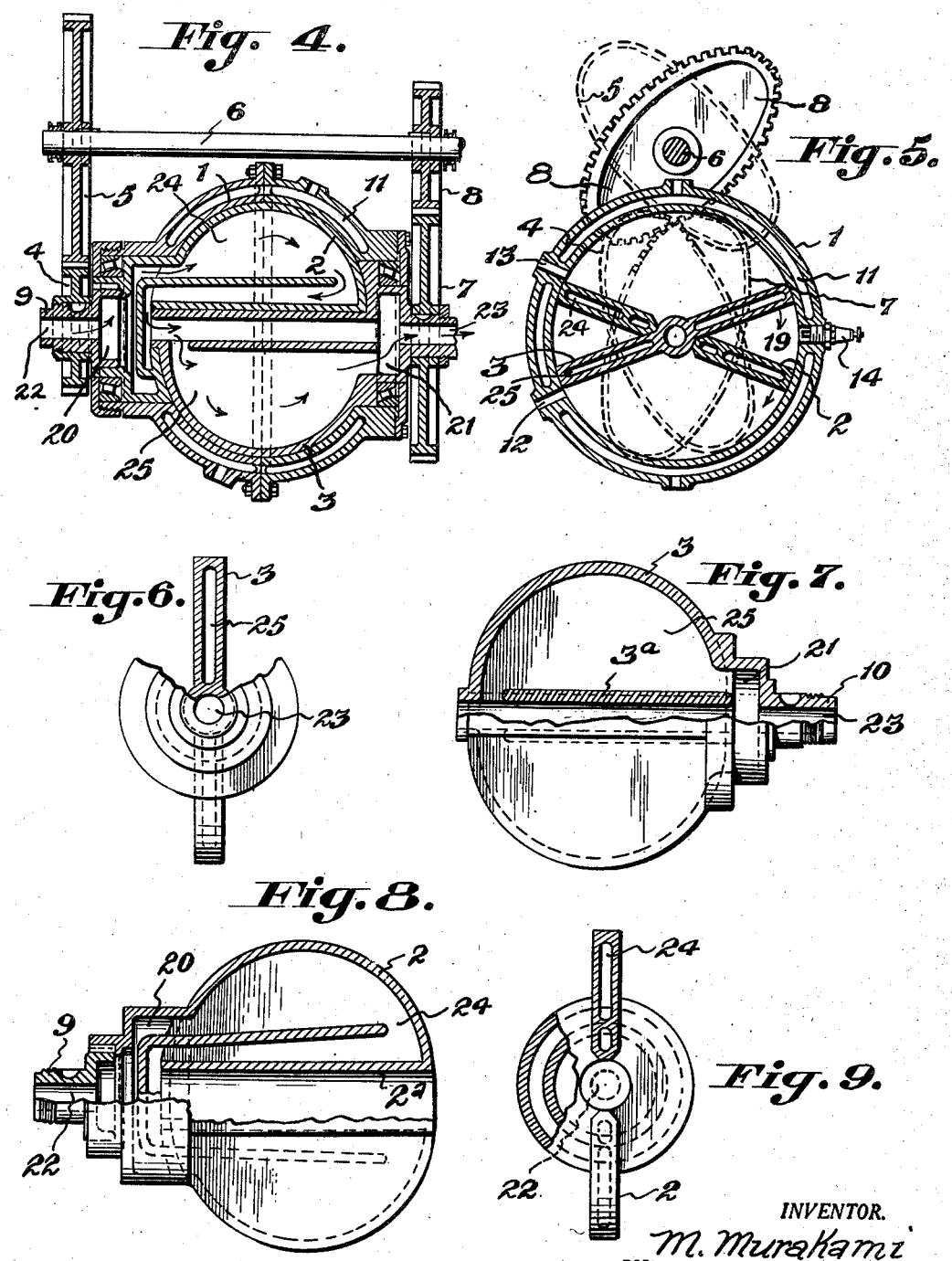
INVENTOR.
M. Murakami
BY:
Glascock Downing Seebold
ATTORNEYS.

Patented Feb. 15, 1938

2,108,385

UNITED STATES PATENT OFFICE 2,108,385

ROTARY ENGINE

Masasuke Murakami, Tokyo, Japan

Application August 30, 1935, Serial No. 38,617
In Japan April 22, 1932

2 Claims. (Cl. 230—144)

My invention relates to rotary engines of cooperatively rotating disc type and more particularly to improvements in transmission gearing and arrangements of working parts to avoid leakage and to provide smooth running, and has for its object to improve and simplify the construction of the essential working parts, the packing means, and to facilitate the water circulation when it is used as a rotary explosion engine.

More particularly, the present invention embraces the provision, in a delicate rotary engine, of non-circular gear wheels defined by a novel formula so as to ensure powerful and high duty operation and increased efficiency of the engine.

There are various kinds of non-circular transmission gearings. For instance, French Patent 396,024 discloses a set of gear wheels having elliptic pitch curves of the same size, each revolving shaft locating at the focus of the ellipse. There is the well-known lobed wheel gearing, in which the outline of the wheel consists of a pair of symmetrically assembled logarithmic spirals of the same size and its revolving shaft passes through the common origin of the curves. None of such gearings have the revolving shafts at the centers of figure, and consequently the equilibrium of rotation of the wheels can never be obtained, thus producing vibration. This shows that the above mentioned gearings are not suitable for industrial purposes necessitating high speed rotation or powerful transmission. Even though the composite lobed wheels, the outline of which consists of pairs of symmetrically assembled logarithmic spirals and has its revolving shaft at the center of figure, can mesh perfectly with each other, they cannot still be expected suitable for powerful transmission, because the outline of each wheel is never a continuous curve, and therefore the acceleration and deceleration of rotation is excessive. If the revolving shaft is located at the center of elliptic gear wheel, such gears would not mesh with each other perfectly so that the frictional transmission is impossible without slip and if teeth are cut along the ellipse, yet imperfect transmission only is obtained. Such facts are described on page 259 of "American Machinist Gear Book".

On the contrary, the ellipse-like and other non-circular curves determined by the specific formula deduced in this application can be theoretically proved to make exact rolling contact without slip and the transmission gear wheels having such curves as their outline can mesh perfectly with each other. In accordance with this invention, such gears are selected and combined with a rotary engine, which has a plurality of revolving discs in one cylinder, and consequently executes a delicate working, thus obtaining a rotary engine of powerful and high-duty operation due to its perfect balancing and minimum force of inertia, and of high efficiency due to its perfect gear engagement. Moreover the speed of the engine can be reduced or increased at any ratio by a suitable selection of pairs of the above mentioned gears without using any separate reduction gears.

Figure 10:
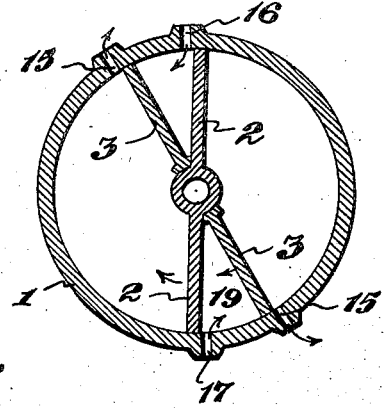
Figure 2:
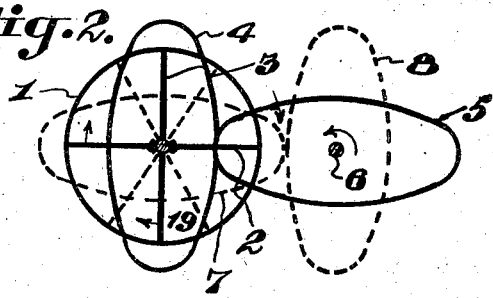
Figure 3:
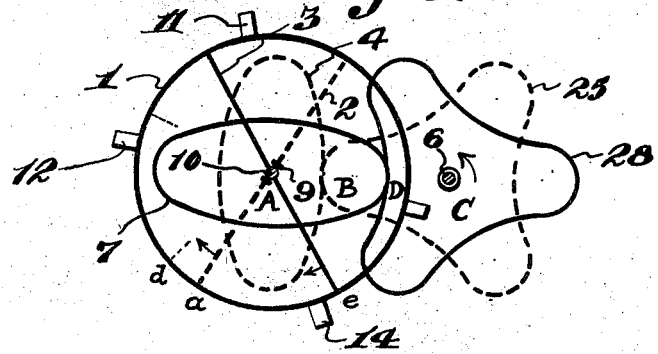

What I consider to be novel and my invention will be better understood by reference to the following specification and appended claims when considered in connection with the accompanying drawings. In the drawings, Fig. 1 is a diagrammatic plan view of a simplest rotary engine to which the present invention is to be applied; Fig. 2 is a skeleton diagram for illustrating the principle of operation of the engine shown in Fig. 1; Fig. 3 is a diagrammatic view illustrating a combination of transmission gears embodying this invention; Fig. 4 is a vertical sectional view of an internal combustion engine embodying my invention; Fig. 5 is also a sectional view of the engine shown in Fig. 4, with the section taken at right angles to that shown in Fig. 4; Fig. 6 is an end elevation, partly in section and partly broken away to facilitate illustration, of the assembly shown in Fig. 7; Fig. 7 is a vertical sectional view of one of the revolving discs and the driving shaft for said disc; Fig. 8 is a view similar to Fig. 7 but illustrating the second revolving disc and its associated elements; Fig. 9 is an end elevation, partly in section and partly broken away to facilitate illustration, of the assembly shown in Fig. 8, and Fig. 10 is a cross-sectional view of the cylinder of a rotary engine embodying this invention.

Referring to Figs. 1 and 2, the cooperating revolving discs 2 and 3 secured to the concentric shafts 9 and 10 respectively are arranged to hermetically fit and rotate in a strong working cylinder 1. The shafts 9 and 10 are coupled respectively to a common side shaft or main shaft 6 by means of special transmission gears 4, 5 and 7, 8 the gears of each pair being set at the phase difference of 90° with respect to each other for transmitting continuously varying cyclic speed so that the discs 2 and 3 may cooperate with each other at the relation settled by the speed ratio of the transmission gears 4, 5 and 7, 8.

The inventor has devised a special transmission gearing the pitch curve of the gear wheel being determined by the following equation:—

$$\rho = \frac{a}{1 \pm b \cos n\theta} \quad (A)$$

wherein $\rho$ represents a radius vector to a point on the curve from the centre of configuration;

$a$ is a finite length;

$b$ is a positive number greater than zero and less than one, and $n$ is a positive integer greater than one depending on the number of symmetrical axes.

If $n=2$ and suitable values are substituted for $a$ and $b$ in the Equation (A), a closed curve will be obtained, although somewhat ellipse-like but never a true ellipse. An ellipse should be excluded from our new transmission gears as $n$ is always greater than 1.

The gear wheels shown in Figs. 1 and 2 are determined from the above Equation (A) by putting $n=2$ and taking suitable numerical values for $a$ and $b$.

The gear wheels 25 and 28 shown in Fig. 3 are regular curved polygonal gear wheels having three axes of symmetry. Such pitch curve can be determined by putting $n=3$ in the Equation (A). Such gears will give a greater reduction of speed.

Referring to Fig. 3, gear wheels 25 and 28 are keyed at the centre of configuration of the shaft 6 with the angularity of 60°. If in this case the main shaft 6 is rotated with uniform speed, the cooperating discs 2 and 3 will be rotated in the same direction with cyclic change of constantly varying relative speeds by means of the transmission gears 4, 25 and 7, 28. Accordingly the discs 2 and 3 may be brought nearer or apart from the other during one cycle of operation so that the cyclic operation such as suction, compression, expansion and exhaust can be effected as in Figs. 1 and 2. Since one complete revolution of the gear wheels 25 and 28 will cause one and a half revolutions of the engaging gear wheels 4 and 7, the main shaft 6 will be driven at a reduced speed by the engine 1.

According to the same principle of operation, the combination of the pairs of the gear wheels shown in Fig. 3 may not only be interchanged, but also the regular triangular curved gear wheel such as the gear wheels 25 and 28 themselves may be combined with each other instead of the gear wheels 5 and 8. Similarly other regular non-circular gear wheels having more than three sets of major and minor axes may be used, such gear wheels may be generally called "regular polygonal curved gear wheels". The transmission gear wheels between the main shaft and the disc shafts determined by the above equation will satisfy the following conditions:—

1. The sum of radius vectors to every contact point from the centres of pairs of shafts should be constant and equal to the centre distance between said shafts, 2. A common tangent should be drawn through every contact point of cooperating gear wheels, 3. The shaft of each wheel should be secured to the centre of configuration constituting the gear wheel, 4. Sets of cooperating gear wheels should be secured to a main shaft with different angularities, and 5. The pitch curve should be a smooth and closed one, having no angular points and abrupt change of curvature.

According to the above conditions, smooth and continuously varying relative speeds can be transmitted to the cooperating discs without lost motion and abrupt change of velocity by the uniform revolution of the main shaft, or vice versa.

A rotary internal combustion engine having improved constructions according to this invention is shown in Figs. 4 to 9. The disc 3 has a central hollow boss 3a which tightly fits into the boss 2a of the disc 2. The discs 2 and 3 are made hollow as shown more clearly in Figs. 6 to 9 and one end of the disc is enlarged to constitute a part of the end cover of the cylinder and also to provide for water spaces 20 and 21 respectively therein. The end of the water space or hollow chamber is extended to the opposite sides of the cylinder to make hollow shafts 9 and 10 respectively, on which the gear wheels 4 and 7 are keyed respectively. Such construction is strong enough and gives good tightness and durability resisting against wearing. The cooling water is supplied into the disc 2 through the central hole 22 of the shaft 9, and after passing through the hollow spaces within the discs the water is taken out through the central passage 23 of the shaft 10. The cylinder 1 is provided with an ignition plug 14 or a fuel valve (not shown) at a suitable position of the space 19 Fig. 5. 12 represents an exhaust port and 13 is a suction inlet of air.

As is apparent from Fig. 4 since the main shaft 6 is arranged outside of the cylinder an aggregated engine may be obtained very easily by combining together desired numbers of cylinders 1 around the shaft 6. The compression ratio of the engine, that is, the ratio of the maximum and minimum volumes of the space 19, Fig. 5, as well as the ratio of relative speeds of the cooperating discs may be changed as desired by suitably selecting the shape, size and combination of the transmission gear wheels.

The present rotary engine can easily be applied to a steam engine or an air engine by providing two pairs of exhaust ports 15 and inlet openings 16, 17 for the cylinder wall as shown in Fig. 10 and also suitable valve devices not shown. If in this case the expansion of steam or air is not utilized no valve device is necessary. If the main shaft is driven by an external power the same machine may be operated as a rotary pump or blower as can be easily understood from the foregoing.

If the present engine is used as a prime mover, various mechanisms such as piston, crank, connecting rods and also valve mechanisms and the like can be dispensed with so that it provides a very simple construction.

Having thus fully described the invention what is claimed as new and desired to be secured by Letters Patent is:

1. A rotary engine comprising a working cylinder, a plurality of cooperating hollow discs hermetically fit in said cylinder and rotatable on overlapping hollow concentric bosses, one end of each disc being enlarged to constitute a part of the cylinder cover and to form a water circulating chamber therein, the disc shafts being extended to the opposite sides of the cylinder from said discs, a main shaft arranged outside of said cylinder, a set of non-circular gear wheels of regular curved configuration having a suitable number of minor and major axes secured to said main shaft at the center of configuration with different angularity, and non-circular gear wheels secured to said disc shafts respectively to engage said gear wheels on said main shaft, each pair of said engaging gear wheels being of the same combination but in different angularity and having the pitch surface determined by the equation $$\rho = \frac{a}{1 \pm b \cos n\theta}$$

where $\rho$ represents a radius vector from the center of the respective gear wheel shaft; $a$ is a finite length; $b$ is a positive fraction, and $n$ is a positive integer greater than unity.

2. In a rotary engine having a plurality of cooperatively rotating discs hermetically fit in a working cylinder and held on independent coaxial shafts, a main shaft arranged outside of said cylinder and the transmission gearing between said main shaft and each of said disc shafts consisting of a plurality of pairs of non-circular gear wheels which will cause a continuously varying relative rotation between said cooperating discs while rotating altogether in the same direction without repose with substantially uniform revolutions of said main shaft, said cooperatively rotating discs being made hollow and hermetically overlapped with each other at the central bosses and one end of each disc being enlarged to constitute a part of the cylinder cover and to form a water circulating chamber therein and a further extension of said hollow chamber constituting the disc shaft, on which the gear wheel is keyed.

MASASUKE MURAKAMI.